United States Patent
Hasler et al.

(10) Patent No.: US 10,199,823 B2
(45) Date of Patent: Feb. 5, 2019

(54) CHAIN-LINK CONVERTER SYSTEM WITH DIFFERENT DC-SOURCES AND METHOD FOR OPERATION

(75) Inventors: Jean-Philippe Hasler, Västerås (SE); Falah Hosini, Sundbyberg (SE)

(73) Assignee: ABB SCHWEIZ AG, Baden (CH)

( * ) Notice: Subject to any disclaimer, the term of this patent is extended or adjusted under 35 U.S.C. 154(b) by 878 days.

(21) Appl. No.: 14/420,264

(22) PCT Filed: Aug. 7, 2012

(86) PCT No.: PCT/EP2012/065385
§ 371 (c)(1),
(2), (4) Date: Mar. 4, 2015

(87) PCT Pub. No.: WO2014/023331
PCT Pub. Date: Feb. 13, 2014

(65) Prior Publication Data
US 2015/0326014 A1    Nov. 12, 2015

(51) Int. Cl.
*H02J 3/38* (2006.01)
*H02M 7/49* (2007.01)
(Continued)

(52) U.S. Cl.
CPC .............. *H02J 3/00* (2013.01); *H02J 3/382* (2013.01); *H02M 7/49* (2013.01); *H02J 3/32* (2013.01);
(Continued)

(58) Field of Classification Search
USPC ........................................................ 307/24
See application file for complete search history.

(56) References Cited

U.S. PATENT DOCUMENTS

2013/0009700 A1\* 1/2013 Deboy ................... H02J 3/383
327/581

FOREIGN PATENT DOCUMENTS

WO     WO 2010/102667 A1    9/2010
WO     WO2012/010063    \*    1/2012
(Continued)

OTHER PUBLICATIONS

Maharjan et al., "A Transformerless Energy Storage System Based on a Cascade Multilevel PWM Converter With Star Configuration", Sep. 1, 2008, pp. 1621-1630.\*
(Continued)

*Primary Examiner* — Rexford Barnie
*Assistant Examiner* — Xuan Ly
(74) *Attorney, Agent, or Firm* — Birch, Stewart, Kolasch & Birch, LLP

(57) ABSTRACT

An electrical chain-link converter system includes a converter phase leg for converting a plurality of DC electrical currents from a plurality of DC power sources to an AC current of an electrical power distribution network. The phase leg includes a plurality of serially connected converter cells each of which is connected to a respective power source of the plurality of DC power sources. The system also includes a control unit associated with the phase leg, the control unit including a processor; and a storage unit storing instructions that, when executed by the processor, cause the control unit to, for each of the converter cells: obtain a dedicated voltage reference for the converter cell; and transmit the voltage reference to the converter cell.

20 Claims, 2 Drawing Sheets

(51) Int. Cl.
*H02J 3/00* (2006.01)
*H02J 3/32* (2006.01)
*H02M 1/00* (2006.01)
*H02M 7/483* (2007.01)

(52) U.S. Cl.
CPC .............. *H02M 2001/0003* (2013.01); *H02M 2007/4835* (2013.01); *Y10T 307/352* (2015.04)

(56) References Cited

FOREIGN PATENT DOCUMENTS

WO     WO 2012/010063     *   1/2012
WO     WO 2012/010063 A1    1/2012

OTHER PUBLICATIONS

Kouro et al., "Control of a cascaded H-bridge multilevel converter for grid connection of photovoltaic systems", 2009, pp. 3976-3982.*
Akagi et al., "A battery energy storage system based on a multilevel cascade PWM converter", IEEE, 2009, pp. 9-18.
Alonso et al., "Cascaded H-Bridge Multilevel Converter for Grid Connected Photovoltaic Generators with Independent Maximum Power Point Tracking of each Solar Array", IEEE, 2003, pp. 731-735.
Maharjan et al., "A Transformerless Energy Storage System Based on a Cascade Multilevel PWM Converter With Star Configuration", IEEE Transactions on Industry Applications, vol. 44, No. 5, Sep./Oct. 2008, pp. 1621-1630.
Tolbert et al., "Multilevel Converters as a Utility Interface for Renewable Energy Systems", IEEE, 2000, pp. 1271-1274.

* cited by examiner

CHAIN-LINK CONVERTER SYSTEM WITH DIFFERENT DC-SOURCES AND METHOD FOR OPERATION

TECHNICAL FIELD

The invention relates to an electrical chain-link converter system comprising a converter phase leg for converting a plurality of direct current (DC) electrical currents from a plurality of DC power sources to an alternating current (AC) of an electrical power distribution network. The phase leg comprises a plurality of serially connected converter cells each of which is connected to a respective power source of the plurality of DC power sources.

BACKGROUND

A three-phase chain-link converter consists of three phase legs where each phase consists of a number of series-connected cell converters. The phase legs of series-connected cell converters can be connected either in delta- or in wye-configuration. Each cell of the converter includes a DC capacitor where the cell energy is stored. The DC voltage of the DC capacitor shall be sufficient to generate an AC voltage component at the cell AC terminal. The energy of the DC capacitor can be extracted from the feeding network, which is the case for voltage source converter (VSC) applications, or from external sources. The external sources may be batteries to be charged and discharged. The power injected into the DC side of the cell shall ideally be equal to the power output on the AC side of the cell.

The power of the sources connected to each cell may not be equal, in terms of sign and magnitude. It is normally assumed for a chain-link converter that the power output of each individual cell shall be equal to each other except when DC voltage unbalances caused by disturbances must be cancelled by control actions. To achieve this equal output, e.g. a battery connected to a cell may be used to adjust for non-equal power of the external power sources.

Also, the external power sources may not be located at the same points which may influence the cost aspect of the system if the power source is connected to the converter cells by means of long cables.

WO 2010/102667 relates to a modular voltage source converter (VSC) comprising one or more phases. Each of the phases comprises converter cell modules connected in series. At least one converter cell module in a phase is assigned a separate distributed energy source in a separate housing. At least one converter cell module in a phase is capable of generating active power, and the converter cell module with an assigned energy source may be placed together at distant places, separate from the other converter cell modules in a phase. This is said to be an advantage compared to having the energy supply for active power generation at a common place, as then there will e.g. be a need for long cables to connect converter cell modules to energy sources.

SUMMARY

It is an objective of the present invention to alleviate a problem of the prior art of how to handle a chain-link converter connected to different power sources having different power (magnitude and/or sign i.e. plus or minus).

According to an aspect of the present invention, there is provided an electrical chain-link converter system. The system comprises a converter phase leg for converting a plurality of direct current (DC) electrical currents from a plurality of DC power sources to an alternating current (AC) of an electrical power distribution network, the phase leg comprising a plurality of serially connected converter cells each of which is connected to a respective power source of the plurality of DC power sources. The system also comprises a control unit associated with the phase leg. The control unit comprises a processor, and a storage unit storing instructions that, when executed by the processor, cause the control unit to, for each of the converter cells: obtain a dedicated voltage reference for the converter cell, the voltage reference being dependent on an active power of the cell, on a total active power of the phase leg, and on a reactive power to be generated by the phase leg; and transmit the voltage reference to the converter cell.

According to another aspect of the present invention, there is provided a method of an electrical chain-link converter system comprising a phase leg of serially connected converter cells each of which is connected to a respective DC power source. The method comprises for each of the converter cells: obtaining a dedicated voltage reference for the converter cell, the voltage reference being dependent on an active power of the cell, on a total active power of the phase leg, and on a reactive power to be generated by the phase leg; and transmitting the voltage reference to the converter cell, wherein respective power inputs of the converter cells, from its respective power sources, are not equal to each other.

An embodiment of the chain-link converter system aspect of the present disclosure may be used for performing any embodiment of the method aspect of the present disclosure.

According to another aspect of the present invention, there is provided a computer program product comprising computer-executable components for causing an electrical chain-link converter system to perform any embodiment of the method of the present disclosure when the computer-executable components are run on a processor included in a control unit of the system.

According to another aspect of the present invention, there is provided a computer program comprising computer program code which is able to, when run on a processor of a control unit comprised in an electrical chain-link converter system, cause the control unit to for each of a plurality of serially connected cells of a phase leg of said converter system: obtain a dedicated voltage reference for the converter cell, the voltage reference being dependent on an active power of the cell, on a total active power of the phase leg, and on a reactive power to be generated by the phase leg; and transmit the voltage reference to the converter cell.

According to another aspect of the present invention, there is provided a computer program product comprising any embodiment of the computer program aspect of the present disclosure, and a computer readable means on which the computer program is stored.

It is an advantage of the present invention that a dedicated voltage reference can be obtained and transmitted for each of the converter cells. The electrical power output of each of the cells do thus not have to be equal to each other, why power sources, such as wind turbines and solar cells, with varying power output may be used as DC sources for the converter cells, without the need to adjust the power input to the cells e.g. by means of batteries. The dedicated (individual, cell specific) voltage references may be calculated in view of the non-equal power output of the different power sources such that the desired active and reactive electrical power generated by the phase leg is obtained for injection into the distribution network.

In some embodiments, the obtaining of a dedicated voltage reference comprises calculating the voltage reference based on received information about the active power of the cell, the total active power of the phase leg, and the reactive power to be generated by the phase leg. Thus, the dedicated voltage references may be calculated such that the non-equal power outputs of the power sources are compensated for. Alternatively, the voltage references may be calculated elsewhere whereby the obtaining of a dedicated voltage reference may comprise receiving the voltage references, e.g. inputted via a user interface (UI) or from an external calculation unit.

In some embodiments, the phase leg is distributed such that each of the converter cells is located in the vicinity of its respective power sources. Thus, the cells are located together with their respective DC power sources, rather than together with each other. This reduces the length of wiring needed for connecting a power source with its respective converter cell. For example, if the power sources are the wind turbines of a wind farm, a converter cell may be co-located with each of the wind turbines, and the wind farm as a whole may serve the phase leg, or all three phase legs. A similar arrangement may be used e.g. for a solar panel farm. It may in some cases be advantageous to only produce one phase in a farm, producing the other two from other farm(s), to reduce the amount of wires/cables.

Thus, in some embodiments, the respective DC power source is a wind turbine. Since, wind turbines may initially produce an AC current, a converter cell connected to a wind turbine, may be connected via an AC/DC rectifier.

In some embodiments, at least one of the converter cells of the phase leg is connected to a plurality of respective power sources. Examples include, two or more wind turbines and/or solar panels, and combinations of wind turbine(s)/solar panel(s) with an electrical storage e.g. a battery.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The electrical power distribution network may be any power grid, such as a power grid for distributing power to industrial and residential buildings or, in a smaller scale, to and within a factory or industrial building.

The phase leg may or may not be one of the phases of a three phase electrical system. The cells of the phase leg are series connected by means of single phase AC cables. The cells can be either wye-connected (between a phase of the power system and a neutral) or delta-connected (between two phases of the power system). The phase leg is configured for producing predetermined desired active and reactive power to be injected into the electrical power distribution network. The power produced may be positive, i.e. power is supplied to the network, or negative, i.e. power is withdrawn from the network, depending on the operating conditions.

The voltage reference may be an AC voltage signal which is sent to the converter cell to which the voltage reference is dedicated. The voltage reference can control the active and/or reactive power/voltage outputted (generated or absorbed) by the cell.

Figure 1:
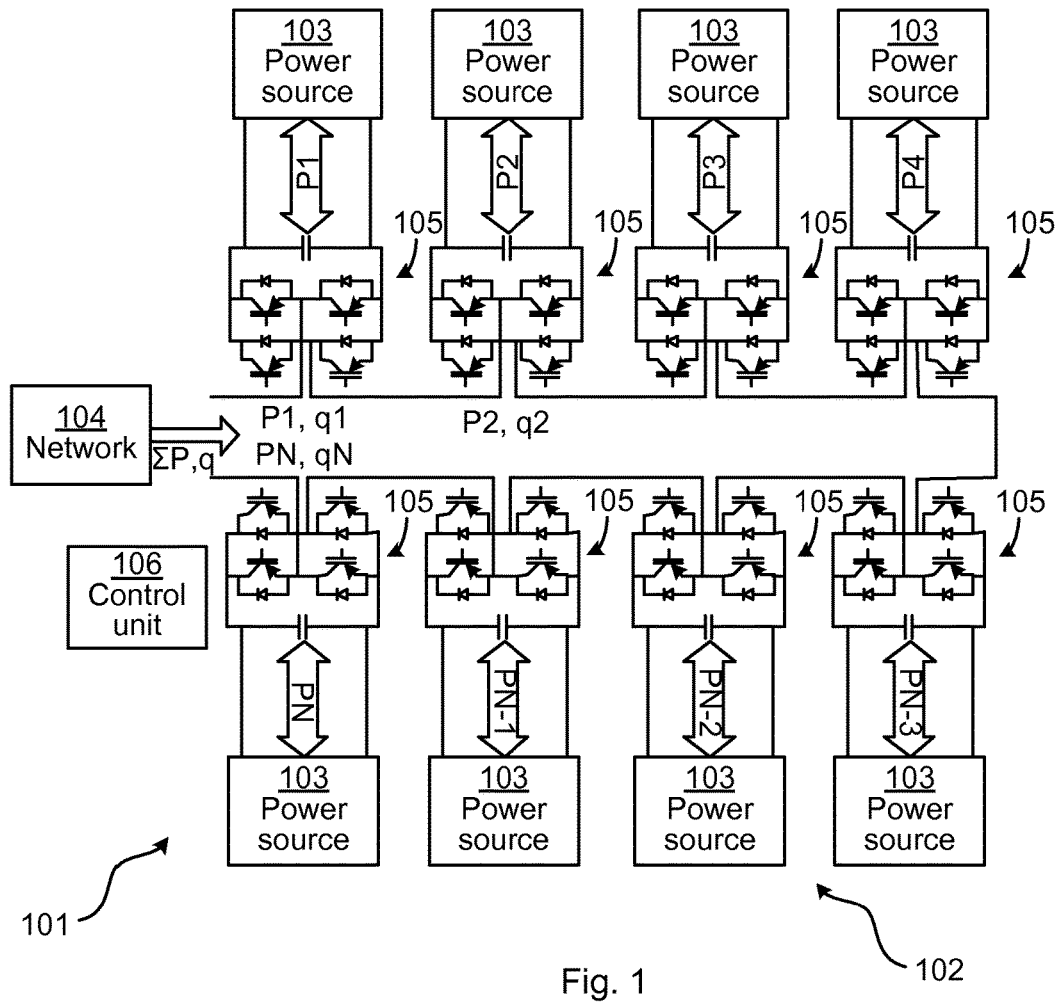
FIG. 1 is a schematic block diagram of an embodiment of a chain-link converter system of the present invention.

FIG. 1 schematically illustrates an embodiment of an electrical chain-link converter system 101 of the present invention. The system comprises a phase leg 102 comprising a plurality of converter cells 105 each of which is connected to a respective DC power source 103. The phase leg is connected to an electrical power distribution network 104. The number of converter cells 105 can be any integer number N. Each cell 105 produces active power p and reactive power q. As indicated for some of the cells 105, a first cell 105 produces active power p1 and reactive power q1, a second cell 105 produces active power p2 and reactive power q2 etc., and the $N^{th}$ cell 105 produces active power pN and reactive power qN. The total produced AC electrical current produced by the phase leg 102 is thus the sum of all the active powers p and all the reactive powers q produced by the cells 105 of the phase leg 102. The total produced AC electrical current produced by the phase leg 102 should be the same as the AC current (phase and magnitude) of the network 104 phase the phase leg 102 is connected to. The amount of power inputted to a cell 105 from its respective power source 103 should preferably be the same as the amount of power outputted from said cell 105. A control unit 106 of the system 101 is associated with the phase leg 102 such that said control unit 106 is able to transmit a voltage reference to each of the converter cells 105 of the phase leg 102. The control unit may be electrically connected via wires to the converter cells 105. The voltage reference may be an AC voltage signal which is sent to the cell 105 to which the voltage reference is dedicated.

Figure 2:
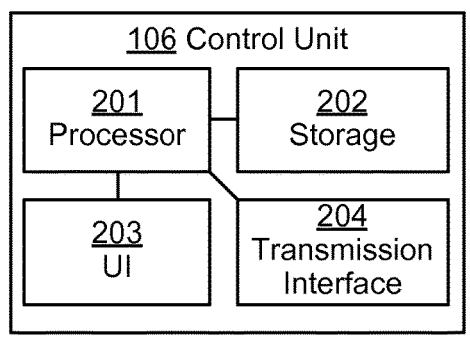
FIG. 2 is a schematic block diagram of an embodiment of a control unit of the present invention.

FIG. 2 is a schematic illustration of a control unit 106, such as the control unit of FIG. 1. The control unit 106 comprises a processor 201 e.g. a central processing unit (CPU). The processor 201 may comprise one or a plurality of processing units in the form of microprocessor(s). However, other suitable devices with computing capabilities could be comprised in the processor 201, e.g. an application specific integrated circuit (ASIC), a field programmable gate array (FPGA) or a complex programmable logic device (CPLD). The processor 201 is configured to run one or several computer program(s) or software stored in a storage unit 202 e.g. a memory. The storage unit is regarded as a computer readable means and may e.g. be in the form of a Random Access Memory (RAM), a Flash memory or other solid state memory, or a hard disk. The processor 201 is also configured to store data in the storage unit 202, as needed. The control unit 106 also comprises a transmission interface 204. The transmission interface 204 is configured to cooperate with the processor to form an electrical voltage signal to be transmitted as a voltage reference via wires/cables to each of the converter cells 105. In some embodiments, the control unit 106 comprises a user interface (UI) 203 configured to allow a user to input instructions and/or information to the control unit. For example, information about how to form the voltage references for each of the cells 105 may in some embodiments be inputted via the UI 203.

Figure 3:
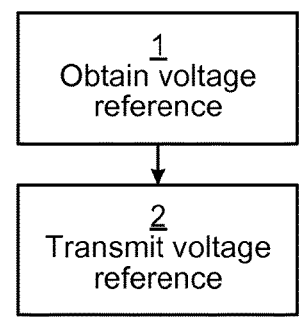
FIG. 3 is a schematic flow chart of an embodiment of a method of the present invention.

FIG. 3 is a schematic illustration of an embodiment of a method of the present invention. A dedicated voltage reference for each of the converter cells 105 is obtained 1. In some embodiments, the voltage reference is obtained 1 at least partly from information inputted to the system 101, typically to the control unit 106, via a UI 203. In some embodiments the voltage reference is obtained 1 by calculating, typically by means of a processor 201, calculating the voltage reference based on received information. Such information may have been received via the UI or automatically e.g. from sensors performing measurements on different parts of the phase leg 102. The voltage reference depends on an active power of the cell, i.e. the active power supplied to the cell 105 from its respective power source 103 and then outputted from said cell. The voltage reference also depends on a total active power of the phase leg, i.e. the active power the phase leg 102 should produce and inject into the network 104. The voltage reference also depends on a reactive power to be generated by the phase leg, i.e. the reactive power the phase leg 102 should produce and inject into the network 104 to achieve an AC current in conformity with the current of the network. After the voltage reference has been obtained 1, it is transmitted 2 to the cell 105 to which it is dedicated. A separate dedicated voltage reference is sent to each of the cells 105 of the phase leg 102.

EXAMPLE

The voltage reference can be calculated by solving, for example, the following equations:

$$p = \sum_{i=1}^{N} p_i$$

Where P=the total power of all N power sources and p1 is the individual power of each of the N power sources, where i is an integer from 1 to N.

$$\bar{i} = i_d + j i_q = \frac{\bar{u}}{p + jq}$$

is the converter current order, where j is the imaginary unit (j=sqrt(−1)).

$$\begin{vmatrix} id & iq & 0 & 0 & \ldots & 0 & 0 \\ 0 & 0 & id & iq & \ldots & 0 & 0 \\ \vdots & \vdots & \vdots & \vdots & \vdots & \vdots & \vdots \\ 0 & 0 & 0 & 0 & 0 & 0 & 1 \\ -iq & id & 0 & 0 & 0 & 0 & 0 \\ 0 & 0 & 0 & 0 & 0 & 0 & 0 \\ 1 & 0 & 1 & 0 & 1 & 0 & 1 \end{vmatrix} \begin{vmatrix} u_{1d} \\ u_{1q} \\ u_{2d} \\ u_{2q} \\ \vdots \\ \vdots \\ u_{Nd} \end{vmatrix} = \begin{vmatrix} p_1 \\ p_2 \\ \vdots \\ p_N - u_{Nq} iq \\ q_1 \\ q_{N-2} \\ u \end{vmatrix}$$

The size of the matrix is (2*i−1).
u=voltage reference for the converter cell phase leg (obtained by the converter current control unit 106)
uid+juiq=voltage reference (complex) for the converter cell i (obtained by the converter current control unit 106)
q=reactive power to be generated by the phase leg 102 (for example determined by the control unit 106)
id=the real part of the phase leg current
iq=the imaginary part of the phase leg current
The following variables may be chosen depending on optimization criteria:
$q_1 \ldots q_{N-2}$ which is the reactive powers of each of N−2 cells
$u_{Nq}$ which is the q-axis voltage (imaginary part of the $N^{th}$ cell voltage vector) of the $N^{th}$ cell 105

In one example of a phase leg which include 4 cells, the DC power sources of the 4 cells generate the following power: p1=0, p2=0.1, p3=0.2, p4=0.25, u=1 and q=0.6. The total power is thus 0.55 per unit (p.u.).

To maintain the AC voltage at the phase leg terminal to u=1.0 p.u., the required reactor power to be produced by the converter shall be q=0.6 p.u.

Figure 4:
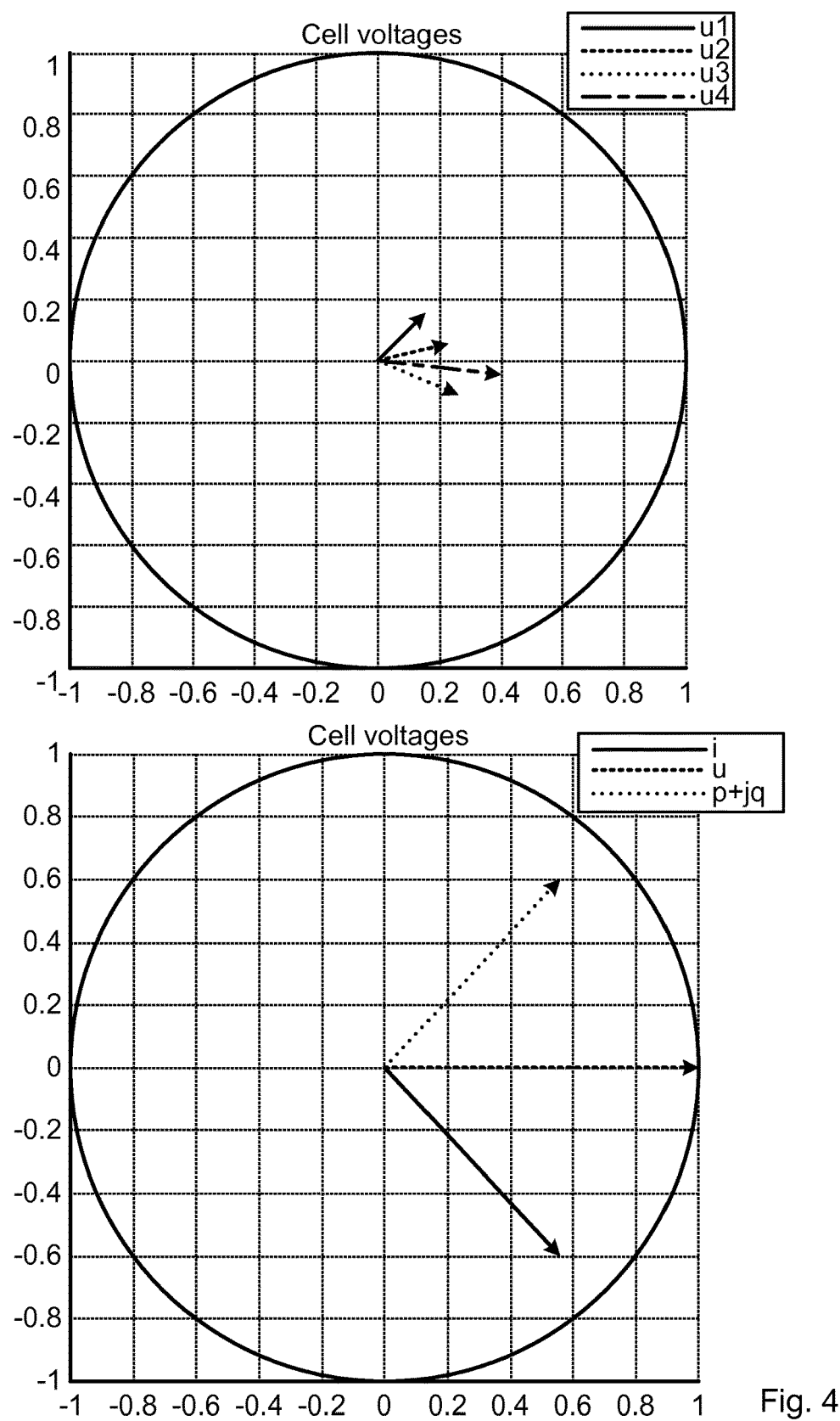
FIG. 4 is a diagram illustrating electrical properties of the power outputs of converter cells according to an example embodiment of the present invention.

By solving the above equation and using an additional optimizing which may consist of minimizing the sum of the square of the cell voltage, the corresponding vector diagrams representing the voltage references of the four cells of this example are shown in FIG. 4.

The sum of the cell voltage is equal to 1.0 p.u. (u in the second vector diagram of FIG. 4), the phase leg current is 0.55-j 0.6 p.u. which correspond a power of 0.55 p.u. and reactive power of +0.6 p.u.

In one embodiment of the present invention, there is provided an electrical chain-link converter system 101 comprising a converter phase leg 102 for converting a plurality of DC electrical currents from a plurality of DC power sources 103 to an AC current of an electrical power distribution network 104. The phase leg comprises a plurality of serially connected converter cells 105 each of which is connected to a respective power source 103 of the plurality of DC power sources. The system also comprises a control unit 106 associated with the phase leg, the control unit comprising a processor; and a storage unit storing instructions that, when executed by the processor, cause the control unit to, for each of the converter cells: obtain a dedicated voltage reference for the converter cell; and transmit the voltage reference to the converter cell The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. An electrical chain-link converter system comprising:
   a converter phase leg for converting a plurality of direct current, DC, electrical currents from a plurality of DC power sources, which are generating varying power outputs which are non-equal to each other, to an alternating current, AC, of an electrical power distribution network, the phase leg comprising a plurality of serially connected converter cells each of which is connected to a respective power source of the plurality of DC power sources, the respective power sources being connected to each of the converter cells in parallel with a capacitor of said each converter cell; and a control unit associated with the phase leg, the control unit comprising:

a processor; and a storage unit storing instructions that, when executed by the processor, cause the control unit to, for each of the converter cells:

obtain a cell-specific dedicated voltage reference for the converter cell, the voltage reference being dependent on an active power of the cell, on a total active power of the phase leg and on a reactive power to be generated by the phase leg, in view of the non-equal power outputs such that the non-equal power outputs are compensated for; and transmit the voltage reference to the converter cell.

2. The system of claim 1, wherein the obtaining of a dedicated voltage reference comprises calculating the voltage reference based on received information about the active power of the cell, the total active power of the phase leg, and the reactive power to be generated by the phase leg.

3. The system of claim 1, wherein the phase leg is distributed such that each of the converter cells is located in the vicinity of its respective power source.

4. The system of claim 1, wherein the respective power source is a wind turbine or a solar panel.

5. The system of claim 1, wherein each of the converter cells is connected to the respective power source via an AC/DC rectifier.

6. The system of claim 1, wherein at least one of the converter cells is connected to a plurality of respective power sources.

7. A method of an electrical chain-link converter system comprising a phase leg of serially connected converter cells each of which is connected to a respective DC power source which power sources are generating varying power outputs which are non-equal to each other, the respective power sources being connected to each of the converter cells in parallel with a capacitor of said each converter cell, the method comprising for each of the converter cells:

obtaining a cell-specific dedicated voltage reference for the converter cell, the voltage reference being dependent on an active power of the cell, on a total active power of the phase leg, and on a reactive power to be generated by the phase leg, in view of the non-equal power outputs such that the non-equal power outputs are compensated for; and transmitting the voltage reference to the converter cell, wherein respective power inputs of the converter cells, from its respective power sources, are not equal to each other.

8. The method of claim 7, further comprising:

receiving information about the active power of each of the cells, the total active power of the phase leg, and the reactive power to be generated by the phase leg, wherein the obtaining of a dedicated voltage reference comprises calculating the voltage reference based on the received information.

9. The method of claim 7, wherein power outputs of the respective power sources varies and are not equal to each other.

10. A computer program product embodied on a non-transitory computer readable medium and comprising computer-executable components for causing an electrical chain-link converter system to perform the method of claim 7 when the computer-executable components are run on a processor included in a control unit of the system.

11. A computer program embodied on a non-transitory computer readable medium and comprising computer program code which is able to, when run on a processor of a control unit comprised in an electrical chain-link converter system, for each of a plurality of serially connected cells of a phase leg of said converter system, wherein each of the cells is connected to a respective DC power source, which power sources are configured for generating varying power outputs which are non-equal to each other, the respective power sources being connected to each of the converter cells in parallel with a capacitor of said each converter cell, cause the control unit to:

obtain a cell-specific dedicated voltage reference for the converter cell, the voltage reference being dependent on an active power of the cell, on a total active power of the phase leg, and on a reactive power to be generated by the phase leg, in view of the non-equal power outputs such that the non-equal power outputs are compensated for; and transmit the voltage reference to the converter cell.

12. The system of claim 2, wherein the phase leg is distributed such that each of the converter cells is located in the vicinity of its respective power source.

13. The system of claim 2, wherein the respective power source is a wind turbine or a solar panel.

14. The system of claim 3, wherein the respective power source is a wind turbine or a solar panel.

15. The system of claim 2, wherein each of the converter cells is connected to the respective power source via an AC/DC rectifier.

16. The system of claim 3, wherein each of the converter cells is connected to the respective power source via an AC/DC rectifier.

17. The system of claim 4, wherein each of the converter cells is connected to the respective power source via an AC/DC rectifier.

18. The system of claim 2, wherein at least one of the converter cells is connected to a plurality of respective power sources.

19. The system of claim 3, wherein at least one of the converter cells is connected to a plurality of respective power sources.

20. The system of claim 4, wherein at least one of the converter cells is connected to a plurality of respective power sources.

* * * * *